US00RE37105E

(19) United States
(12) Reissued Patent
Baranski et al.

(10) Patent Number: US RE37,105 E
(45) Date of Reissued Patent: Mar. 20, 2001

(54) LUBRICANTS CONTAINING ASHLESS ANTIWEAR-DISPERSANT ADDITIVE HAVING VISCOSITY INDEX IMPROVER CREDIT

(75) Inventors: John R. Baranski, Southington, CT (US); Cyril A. Migdal, Pleasant Valley, NY (US)

(73) Assignee: Uniroyal Chemical Company, Inc., Middlebury, CT (US)

(21) Appl. No.: 09/453,582

(22) Filed: Dec. 2, 1999

Related U.S. Patent Documents

Reissue of:
(64) Patent No.: 5,698,500
Issued: Dec. 16, 1997
Appl. No.: 08/794,111
Filed: Feb. 3, 1997

(51) Int. Cl.[7] ..... C10M 151/02; C10M 149/02
(52) U.S. Cl. ..... 508/273; 525/256; 525/259; 525/349
(58) Field of Search ..... 508/273; 525/256, 525/259, 349

(56) References Cited

U.S. PATENT DOCUMENTS

| | | | | |
|---|---|---|---|---|
| 3,522,180 | | 7/1970 | Sweeney et al. | 252/59 |
| 4,026,809 | | 5/1977 | Lachowiez et al. | 252/51.5 |
| 4,089,794 | | 5/1978 | Engel et al. | 252/51.5 |
| 4,107,059 | * | 8/1978 | King et al. | 508/273 |
| 4,137,185 | | 1/1979 | Gardiner et al. | 252/33 |
| 4,144,181 | | 3/1979 | Elliott et al. | 252/33 |
| 4,146,489 | | 3/1979 | Stambaugh et al. | 252/50 |
| 4,234,435 | | 11/1980 | Meinhardt et al. | 252/51.5 |
| 4,320,019 | | 3/1982 | Hayashi | 252/51.5 |
| 4,340,689 | | 7/1982 | Joffrion | 525/263 |
| 4,357,250 | | 11/1982 | Hayashi | 252/51.5 |
| 4,382,007 | | 5/1983 | Chafetz et al. | 252/51.5 |
| 4,668,834 | | 5/1987 | Rim et al. | 585/12 |
| 4,761,482 | * | 8/1988 | Karol | 508/273 |
| 4,863,623 | | 9/1989 | Nalesnik | 252/50 |
| 4,904,403 | | 2/1990 | Karol | 252/47.5 |
| 5,075,383 | | 12/1991 | Migdal et al. | 525/293 |
| 5,162,086 | | 11/1992 | Migdal et al. | 252/47.5 |
| 5,188,745 | | 2/1993 | Migdal et al. | 252/47 |
| 5,200,102 | | 4/1993 | Mishra et al. | 252/475 |
| 5,460,740 | * | 10/1995 | Migdal et al. | 508/273 |
| 5,474,694 | | 12/1995 | Shirodkar et al. | 252/51.5 |
| 5,490,864 | * | 2/1996 | Herbstman et al. | 44/379 |

* cited by examiner

*Primary Examiner*—Jacqueline V. Howard
(74) *Attorney, Agent, or Firm*—Raymond D. Thompson; Paul Grandinetti

(57) ABSTRACT

A graft copolymer is disclosed. The copolymer is prepared by the interpolymerization of a mixture of monomers comprising ethylene, a $C_3$ to $C_{12}$ alpha monoolefin, and a polyene being a member selected from the group consisting of non-conjugated dienes and trienes. Grafted to the copolymer is a 2-mercapto-1,3,4-thiadiazole moiety. Lubricating oil additives and lubricating oils comprising the graft copolymer are also disclosed.

29 Claims, No Drawings

LUBRICANTS CONTAINING ASHLESS ANTIWEAR-DISPERSANT ADDITIVE HAVING VISCOSITY INDEX IMPROVER CREDIT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to lubricants, especially lubricating oils. More particularly, the invention relates to a class of ashless and phosphorus-free antiwear, anti-fatigue, dispersant additives having viscosity index improving credit that are preferably derived from an ethylene-propylene diene modified copolymer (EPDM) and a 2-mercapto-1,3,4-thiadiazole derivative.

2. Description of Related Art

In developing lubricating oils, there have been many attempts to provide additives that impart anti-fatigue, antiwear, and extreme pressure properties to the oils. Also, many additives are known that provide a lubricating oil with dispersancy of sludge. In addition, the formulation of an oil to meet high and low temperature viscosity requirements is critical, and in most cases a viscosity index improver is employed to achieve this goal. Most multifunctional additives of the prior art provide one or two of these features.

Zinc dialkyldithiophosphates (ZDDP) have been used in formulated oils as antiwear additives. However, zinc dialkyldithiophosphates give rise to ash, which contributes to particular matter in automotive exhaust emissions. Regulatory agencies are seeking to reduce emissions of zinc into the environment. In addition, the phosphorus of these compounds is also suspected of limiting the service life of the catalytic converters that are used on cars to reduce pollution. It is important to limit the particulate matter and pollution formed during engine use for toxicological and environmental reasons, but it is also important to maintain the antiwear properties of the lubricating oil.

It is also well-known that internal combustion engines operate under a wide range of temperatures, including low temperature stop-and-go driving service, as well as high-temperature conditions produced by continuous high speed driving. Stop-and-go driving, particularly under cold, damp weather conditions, leads to the formation of sludge in the crankcase and in the oil passages of a gasoline or a diesel engine. This sludge seriously limits the ability of the crankcase engine oil to lubricate the engine effectively. In addition, the sludge, with its entrapped water, tends to contribute to rust formation in the engine. These problems can be aggravated by engine manufacturers' lubrication service recommendations, which typically specify extended oil drain intervals.

Additives that protect engines against sludge formation generally contain nitrogen. These additives are also known as dispersants and/or detergents in the formulation of crankcase lubricating oil compositions. The preparation of many of the known dispersant/detergent compounds is based on the reaction of an alkenylsuccinic acid or anhydride with an amine or polyamine to produce an alkenyl succinimide or an alkenylsuccinamic acid or anhydride as an intermediate. This is advantageous since these products, if not completely reacted with amine or polyamine, can cause rust in an engine. In most cases, to produce an alkenyl succinimide, an intermediate must first be manufactured and then further reacted. Thus, two steps are required in the manufacturing process.

It is common practice to chlorinate the alkenyl group either before or after reaction with the acid anhydride, but prior to reaction with the amine or polyamine, in order to produce a reaction product in which a portion of the amine or polyamine is attached directly to the alkenyl moiety. The thrust of many of these processes is to produce a product having a relatively high level of nitrogen in order to provide improved dispersancy. However, chlorine is an environmentally undesirable by-product of such processes, and it would therefore be advantageous to achieve relatively high levels of nitrogen without the use of chlorine.

Ethylene-propylene copolymers and ethylene-alpha olefin non-conjugated diene copolymers that have been grafted and derivatized to provide valuable properties in lubricating oil compositions are well known.

U.S. Pat. No. 3,522,180 discloses a method for the preparation of an ethylene-propylene copolymer substrate effective as a viscosity index improver for lubricating oils.

U.S. Pat. No. 4,026,809 discloses graft copolymers of a methacrylate ester and an ethylene-propylene-alkylidene norbornene terpolymer as a viscosity index improver for lubricating oils.

U.S. Pat. No. 4,089,794 discloses ethylene copolymers derived from ethylene and one or more $C_3$ to $C_{28}$ alpha olefins solution-grafted with an ethylenically-unsaturated carboxylic acid material followed by a reaction with a polyfunctional material, such as a polyamine, a polyol, or a hydroxylamine that is reactive with the carboxyl groups of the acid.

U.S. Pat. Nos. 4,137,185 and 4,144,181 disclose an oil-soluble, derivatized ethylene copolymer derived from about 2 to 98 wt. percent ethylene, and one or more $C_3$ to $C_{28}$ alpha-olefins, e.g., propylene. These compounds are preferably solution-grafted under an inert atmosphere and at elevated temperatures in the presence of a high-temperature, decomposable free-radical initiator with an ethylenically-unsaturated dicarboxylic acid material. Thereafter, the graft copolymer is reacted with a polyamine having at least two primary amine groups, e.g., an alkylene polyamine such as diethylene triamine, to form carboxyl-grafted polymeric imide, usually maleimide, derivatives. The derivatives are reacted with an anhydride of a $C_1$ to $C_{30}$ hydrocarbyl substituted acid, preferably acetic anhydride, to yield an oil-soluble, stable amide derivative of the polyamine that exhibits minimal viscosity change over an extended period of time. Useful number average molecular weights ($M_n$) of the copolymers range from about 700 to 500,000. If the molecular weight is in the range of 10,000 to 500,000, then these copolymers are also useful as multifunctional viscosity index improvers.

U.S. Pat. No. 4,146,489 discloses graft copolymers wherein the backbone polymer is a rubbery, oil-soluble ethylene-propylene copolymer or ethylene-propylene diene modified terpolymer and the graft monomer is a C-vinylpyridine or N-vinylpyrrolidone that imparts dispersant properties to hydrocarbon fuels and combined viscosity index improvement and dispersant properties to lubricating oils for internal combustion engines. The graft copolymers are prepared by intimate admixture of the backbone polymer, monomer to be grafted, and a free radical initiator at a temperature below initiation temperature, followed by a temperature increase to or above the initiation temperature, thus providing a product containing little or no by-product.

U.S. Pat. No. 4,234,435 discloses carboxylic acid acylating agents derived from polyalkenes and a carboxylic reactant having a molecular weight from about 1,300 to 5,000 and having at least 1.3 carboxylic groups per equivalent of polyalkene.

U.S. Pat. No. 4,320,019 discloses a multipurpose lubricating additive prepared by the reaction of an interpolymer of ethylene and a $C_1$ to $C_8$ alpha-monoolefin with an olefinic carboxylic acid acylating agent to form an acylating reaction intermediate that is then reacted with an amine.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with monoamine-polyamine mixture.

U.S. Pat. No. 4,382,007 discloses a dispersant-viscosity index improver prepared by reacting a polyamine-derived dispersant with an oxidized ethylene-propylene polymer or an ethylene-propylene-diene terpolymer.

U.S. Pat. No. 4,668,834 discloses low molecular weight copolymers comprised of ethylene, an alphaolefin and, optionally, a nonconjugated polyene, which copolymers have a viscosity index of at least about 75 and vinylidene-type unsaturation. The copolymers are said to possess unexpected advantages as intermediates in epoxy-grafted electrical encapsulation compositions.

U.S. Pat. No. 4,863,623 discloses multifunctional grafted and derivatized copolymers that provide viscosity index improvement, dispersancy, and antioxidant properties in a multigrade lubricating oil composition. The additive composition comprises a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin, and from about 0 to 15 mole percent of the polyene having an average molecular weight ranging from about 5,000 to 500,000, which has been reacted with at least one olefinic carboxylic acid acylating agent to one or more acylating reaction intermediates characterized by having a carboxylic acid acylating function within their structure and reacting the reaction intermediate with an amino-aromatic polyamine compound. The amino-aromatic polyamine compound is a member selected from the group consisting of an N-arylphenylenediamine, an aminothiazole, an amino carbazole, an aminoindole, an aminopyrrole, an amino indazolinone, an aminomercaptotriazole, and an aminoperimidine to form the graft and amine-derivatized copolymer. A lubricating oil composition containing the additive is also disclosed.

U.S. Pat. No. 4,904,403 discloses compounds derived from 2,5-dimercapto-1,3,4-thiadiazole and one or two moles of polyolefin having 5 to 400 carbon atoms. The 5-position of the 2-mercapto-1,3,4-thiadiazole can be substituted by an alkylthio, a 2-hydroxyalkylthio, an amino, or a hydroxy group. The compounds are said to be effective dispersants, antiwear agents, and antioxidants when incorporated into lubricating compositions.

U.S. Pat. No. 5,075,383 discloses an additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin and from about 0 to 15 mole percent of the polyene. The copolymer has an average molecular weight ranging from about 5,500 to 50,000 and has grafted thereon at least 1.8 molecules of a carboxylic acid acylating function per molecule of the copolymer. The grafted copolymer is reacted with an amino-aromatic polyamine compound from the group consisting of an N-arylphenylenediamine, an aminocarbazole, and an aminoperimidine to form the graft and amine-derivatized copolymer. A lubricating oil composition containing the additive is also disclosed.

U.S. Pat. No. 5,162,086 discloses an additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin and from about 0 to 15 mole percent of the polyene. The copolymer has a number average molecular weight ranging from about 5,500 to 50,000 and has grafted thereon at least 1.8 molecules of a carboxylic acid acylating function per molecule of the copolymer. The grafted copolymer is reacted with an amine substituted phenothiazine to form the graft and amine-derivatized copolymer. A lubricating oil composition containing the additive is also disclosed.

U.S. Pat. No. 5,188,745 discloses an additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin, and from about 0 to 15 mole percent of the polyene. The copolymer has an average molecular weight ranging from about 5,500 to 500,000 and has been reacted with at least one olefinic carboxylic acid acylating agent to form one or more acylating reaction intermediates characterized by having a carboxylic acid acylating function within their structure. This reaction intermediate is then reacted with an N-(2-aminoalkyl)imidazolidone to form the grafted derivatized copolymer. A lubricating oil composition containing the additive is also disclosed.

U.S. Pat. No. 5,200,102 discloses an additive composition comprising a graft and derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin and from about 0 to 15 mole percent of the polyene having an average molecular weight ranging from about 5,000 to 500,000, which has been reacted with at least one olefinic carboxylic acid acylating agent to form one or more acylating reaction intermediates characterized by having a carboxylic acid acylating function within their structure. The reaction intermediate is reacted with an amino alkylthio thiadiazole to form the graft derivatized copolymer. A lubricating oil composition containing the graft derivatized copolymer is also disclosed.

U.S. Pat. No. 5,474,694 discloses an additive composition comprising a graft and amine-derivatized copolymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of the $C_3$ to $C_{10}$ alpha-monoolefin, and from about 0 to 15 mole percent of the polyene. The copolymer has a number average molecular weight ranging from about 5,500 to 50,000 and has grafted thereon at least 1.8 molecules of a carboxylic acid acylating function per molecule of the copolymer. The grafted copolymer is reacted with an amino alcohol compound selected from the group consisting of a 2-anilinoalcohol, a (2-hydroxyalkyl)pyridine, a 4-(2-hydroxyalkyl)morpholine, a 1-(2-hydroxyalkyl)piperazine, and a 1-(2-hydroxyalkyl)2-pyrrolidine.

An object of this invention is to provide a novel graft copolymer composition.

Another object of this invention is to provide a lubricant additive and lubricant composition containing such an additive, which has improved dispersancy and antiwear properties and which can withstand the stresses imposed by modern internal combustion engines.

SUMMARY OF THE INVENTION

As stated above, the present invention is directed to lubricants, especially lubricating oils, and more particularly to a class of ashless and phosphorus-free antiwear, anti-fatigue, dispersant additives having viscosity index improving credit that are preferably derived from an EPDM copolymer and a 2-mercapto-1,3,4-thiadiazole. As used herein, the term "EPDM" is intended to be interpreted in a broad sense, such that "P" stands for any $C_3$–$C_{10}$ alpha monoolefin and "D" stands for both dienes and trienes.

The terms polymer and copolymer are used generically herein to encompass ethylene copolymers, terpolymers, or interpolymers. These materials can contain minor amounts of other olefinic monomers so long as their basic characteristics are not materially changed.

More particularly, the present invention relates to a graft copolymer comprising:

A. a copolymer prepared by the interpolymerization of a mixture of monomers comprising:

1) ethylene, 2) a $C_3$–$C_{12}$ alpha monoolefin, and 3) a polyene being a member selected from the group consisting of non-conjugated dienes and trienes, having grafted thereon:

B. a 2-mercapto-1,3,4-thiadiazole moiety.

In another embodiment, the present invention relates to a lubricant additive comprising a graft copolymer comprising:

A. a copolymer prepared by the interpolymerization of a mixture of monomers comprising:

1) ethylene, 2) a $C_3$–$C_{12}$ alpha monoolefin, and 3) a polyene being a member selected from the group consisting of non-conjugated dienes and trienes, having grafted thereon:

B. a 2-mercapto-1,3,4-thiadiazole moiety.

In still another embodiment, the present invention relates to a lubricant comprising a lubricant additive comprising a graft copolymer comprising:

A. a copolymer prepared by the interpolymerization of a mixture of monomers comprising:

1) ethylene, 2) a $C_3$–$C_{12}$ alpha monoolefin, and 3) a polyene being a member selected from the group consisting of non-conjugated dienes and trienes, having grafted thereon:

B. a 2-mercapto-1,3,4-thiadiazole moiety.

It is preferred that the lubricant be a lubricating oil.

DESCRIPTION OF THE PREFERRED EMBODIMENTS

The additives of this invention can be used as either partial or complete replacements for the zinc dialkyldithiophosphates and/or alkenyl succinimides or other dispersants currently used. They can also be used in combination with other additives typically found in motor oils, as well as with other ashless antiwear additives. These additives, due to their polymeric nature, can also be used to provide viscosity index improver credit and, thus, can be used as partial or complete replacements for viscosity index improvers currently known in the art.

The ashless and phosphorus-free, anti-fatigue, antiwear, viscosity index improving lubricating oil dispersants of the present invention are derived from an EPDM copolymer and a 2-mercapto-1,3,4-thiadiazole, preferably 2,5-dimercapto-1,3,4 thiadiazole, and can preferably have the following structure:

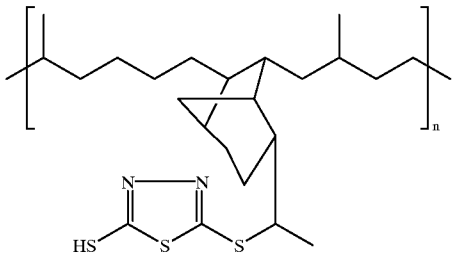

where n is an integer in the range of about 1 to about 10.

The graft copolymer lubricant additives of the present invention can be prepared by means of a solution polymerization process. The *graft copolymer of the* present invention, *when used as a lubricant additive,* comprises an ethylene copolymer of a $C_3$–$C_{12}$ alpha-monoolefin and a non-conjugated diene or triene having an average molecular weight ranging from about 500 to 40,000, preferably 2,000 to 10,000, on which has been grafted from about 0.1 to about 20 percent by weight, preferably from about 0.5 to about 10 percent by weight, of a mercapto-1,3,4-thiadiazole.

The copolymers employed in the practice of this invention are useful intermediates in the production of grafted compositions.

The copolymers employed in the practice of this invention are copolymers of ethylene, an alphaolefin having the formula $H_2C{=}CHR$ wherein R is an alkyl radical comprising 1 to 10 carbon atoms and a nonconjugated polyene.

The alphaolefins employed in the practice of this invention are compounds of the formula $CH_2{=}CHR$ wherein R is an alkyl radical containing from one to ten carbon atoms. When R contains more than two carbon atoms, such a radical can be a straight chain or branched. Preferred alphaolefins include propylene, 1-butene, 1-pentene, 1-hexene, 3-methyl-1-pentene, 1-heptene, 1-octene, and 1-decene.

The polyenes employed in the practice of this invention are nonconjugated. Illustrative of such nonconjugated polyenes are aliphatic dienes such as 1,4-hexadiene, 1,5-hexadiene, 1,4-pentadiene, 2-methyl-1,4-pentadiene, 3-methyl-1,4 hexadiene, 4-methyl-1,3-hexadiene, 1,7-octadiene, 1,9-decadiene, exo- and endodicyclopentadiene and the like; exo- and endo-alkenylnorbornenes, such as 5-propenyl-, 5-(buten-2-yl)-, and 5-(2-methylbuten-[2']-yl) norbornene and the like; alkylalkenylnorbornenes, such as 5-methyl-6-propenylnorbornene and the like; alkylidenenorbornenes, such as 5-methyl-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like.

Any triene component has at least two non-conjugated double bonds and up to about 30 carbon atoms in the chain. Typical trienes useful in preparing the copolymer of the present invention are 1-isopropylidene-3a,4,7,7a-tetrahydroindene, 1-isopropylidenedicyclopentadiene, dehydroisodicyclopentadiene, and 2-(2-methylene-4-methyl-3-pentenyl){2.2.1}bicyclo-5-heptene. A mixture of more than one triene can be used in the preparation of the copolymer. Mixtures of one or more trienes with one or more dienes can also be used.

The molar ethylene content of the copolymers of this invention is preferably in the range of between about 20 and about 80 percent, is more preferably between about 30 and about 70 percent, and is most preferably between about 35 and about 65 percent, although higher or lower ethylene contents can be present. The nonconjugated polyene molar percent generally ranges between about 0.1 and about 25 percent. The remaining mole percent of such copolymers, up to 100 percent, is comprised of alphaolefin.

The copolymer employed in the practice of this invention may possess vinylidene-type unsaturation. Thus, one end of such polymer has the formula $P—CR{=}CH_2$ wherein R is as defined above, for the alphaolefins which can be employed, and P represents the polymer chain.

When the composition of this invention comprises copolymer chains with vinylidene-type unsaturization, at least about 30 percent of the chains will possess such unsaturation. Preferably at least about 50 percent, more preferably at least about 60 percent, and most preferably at least about 75 percent, of such polymer chains exhibit vinylidene-type unsaturation. The percentage of polymer chains exhibiting vinylidene-type unsaturation can be determined by FTIR spectroscopic analysis or titration.

The copolymer and the composition of this invention can be prepared employing a Group 4 element of the Periodic Table as defined in the *Handbook of Chemistry and Physics,* (CRC Press, 66th Ed., 1985–1986) catalyst and an aluminoxane cocatalyst.

The catalysts that can be employed are generally of the Formula $Q_nMJ_{4-n}$ wherein Q is cyclopentadiene, cyclopentadiene substituted with up to five $C_1$ to $C_6$ alkyl groups, or indene; M is zirconium, titanium, or hafnium; J is $C_1$ to $C_4$ alkyl, halogen, $CH_2AlR''_2$, $CH_2CH_2AlR''_2$ or $CH_2CH(AlR''_2)_2$ wherein R" is $C_1$ to $C_6$ alkyl or $OAl(C_1–C_6\ alkyl)_2$; and n is 1, 2, or 3. Preferably Q is cyclopentadiene, methylcyclopentadiene or indene; M is zirconium or titanium; J is methyl, ethyl, Cl or Br; and n is 2 or 3. Most preferably Q is cyclopentadiene; M is zirconium; J is methyl or chlorine; and n is 2. Representative catalysts include: $(C_5H_5)_3TiC_2H_5$; $(C_5H_5)_2$; $(CH_3C_5H_4)_2HaCl_2$; $(C_5H_5)_2ZrCH_3Cl$; $(C_5H_5)_3ZrC_2H_5$; $(C_5H_5)_2Zr(CH_3)_2$; $(C_5H_5)_2ZrCl_2$; and $(C_5H_5)_2ZrBr_2$.

The cocatalysts that are typically employed to produce the polymer intermediates of this invention are aluminoxanes either having the linear formula (a) $R'_2AlO—(AlR'O)_n—AlR'_2$ or the cyclic formula (b) $(—AlR'O—)_{n+2}$ wherein R' is linear or branched $C_1$ to $C_6$ alkyl and n is an integer of 2 to 40; preferably R' is methyl or ethyl and n is 6 to 20. Most preferably cocatalysts have the formula (b) wherein R' is methyl and n is 10 to 20. Preferred cocatalysts include linear or cyclic methaluminoxane, ethylaluminoxane, and butylaluminoxane.

The catalysts system is employed so that the Al/M molar ratio, wherein M is as defined above, is between about 10 and 10,000, is preferably between about 20 and about 5,000, and most preferably between about 40 and about 2,000.

Polymerization is generally conducted at temperatures ranging between about 20° and about 100° C., preferably between about 30° and about 80° C. Reaction time is not critical and can vary from several hours or more to several minutes or less, depending upon factors such as reaction temperature, the monomers to be copolymerized, and the like. One of ordinary skill in the art can readily obtain the optimum reaction time for a given set of reaction parameters by routine experimentation.

The polymerization can be conducted employing liquid monomer, such as liquid propylene, as the reaction medium. Alternatively, polymerization can be accomplished in the presence of a hydrocarbon inert to the polymerization such as butane, pentane, isopentane, isopentane, hexane, isooctane, decane, toluene, xylene, and the like.

If so desired, the polymerization can be performed in the presence of hydrogen to further lower polymer molecular weight. The reaction must be monitored to ensure that the vinylidene-type unsaturization is not reduced to less than about 30 percent of the polymer chains.

When performing the polymerization in a batch-type fashion, alphaolefin, ethylene, polyene, and the reaction medium, if any is present, are charged at appropriate ratios to a suitable reactor. The reaction must be monitored to ensure that all ingredients are dry with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence.

Alternatively, the catalyst and cocatalyst can be premixed in a solvent and then charged to the reactor. As polymer is being formed, additional monomers can be added to the reactor. Upon completion of the reaction, unreacted monomer and solvent are either "flashed off" or distilled off, if necessary by vacuum, and the low molecular weight copolymer is withdrawn from the reactor.

The polymerization can be conducted in a continuous manner by simultaneously feeding the reaction medium, if employed, monomers, catalyst, and cocatalyst to a reactor and withdrawing solvent, unreacted monomer and polymer from the reactor so as to allow a residence time of ingredients long enough for forming copolymer of the desired molecular weight and separating the copolymer from the reaction mixture.

Alternatively, the polymerization reaction used to form the polymer substrate can be carried out in the presence of a Ziegler-Natta catalyst in a solvent medium. The polymerization can be conducted employing liquid monomer, such as liquid propylene, as the reaction medium, or in the presence of a hydrocarbon inert to the polymerization such as butane, pentane, isopentane, hexane, isooctane, decane, toluene, xylene, and the like.

In a typical preparation of a polymer substrate, hexane is initially introduced into the reactor and the temperature raised to about 30° C. The appropriate quantities of dry propylene, ethylene, termonomer (e.g., triene), and hydrogen are fed into the reactor. The appropriate reactor pressure is a function of the desired product. Next, the catalyst system consisting of vanadium oxytrichloride, aluminum sesquichloride, and a halogenated ester modifier are added to initiate polymerization. One of ordinary skill in the art can readily obtain the optimum reaction time for a given set of reaction parameters by routine experimentation.

In the practice of the present invention, a thiadiazole is grafted onto the prescribed copolymer backbone. The thiadiazole is a 2-mercapto-1,3,4-thiazole characterized by the structural formula

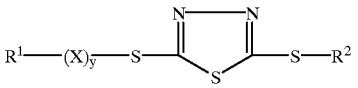

wherein $R^1$ is hydrogen, alkyl, alkenyl, aryl, alkaryl, aralkyl, or 2-hydroxyalkyl;

X is sulfur;

Y is 0 or 1; and $R^2$ is hydrogen or

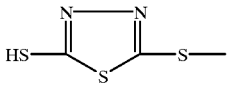

Where $R^1$ is alkyl, it is preferably an alkyl of from 1 to 40 carbon atoms and can have either a straight chain or a branched chain, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, triacontyl, pentatriacontyl, tetracontyl, and the like, and isomers and mixtures thereof.

Where $R^1$ is alkylene, it is preferably an alkylene of from 2 to 40 carbon atoms and can have either a straight chain or a branched chain, e.g., ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicosylene, heneicosylene, dococylene, tricosylene, tetracosylene, pentacosylene, triacontylene, pentatriacontylene, tetracontylene, and the like, and isomers and mixtures thereof.

Where $R^1$ is 2-hydroxyalkyl, it is preferably a 2-hydroxyalkyl of from 1 to 40 carbon atoms and can be either a straight chain or a branched chain, e.g. 2-hydroxymethyl, 2-hydroxyethyl, 2-hydroxypropyl, 2-hydroxybutyl, 2-hydroxypentyl, 2-hydroxyhexyl, 2-hydroxyheptyl, 2-hydroxyoctyl, 2-hydroxynonyl, 2-hydroxydecyl, 2-hydroxyundecyl, 2-hydroxydodecyl, 2-hydroxytridecyl, 2-hydroxytetradeoyl, 2-hydroxypentadecyl, 2-hydroxyhexadecyl, 2-hydroxyheptadecyl, 2-hydroxyoctadecyl, 2-hydroxynonadecyl, 2-hydroxyeicosyl, 2-hydroxyheneicosyl, 2-hydroxydocosyl, 2-hydroxytrioosyl, 2-hydroxytetracosyl, 2-hydroxypentacosyl, 2-hydroxytriacontyl, 2-hydroxypentatriacontyl, 2-hydroxytetracontyl, and the like, and isomers and mixtures thereof.

Where $R^1$ is aryl, aralkyl, or alkaryl, it preferably comprises from 6 to 12 carbon atoms. Additionally, one or more of the ring carbon atoms can be replaced by an atom of a suitable alternative element, for example, nitrogen, oxygen, or sulfur. For example, $R^1$ can be a residue or benzene, toluene, xylene, indene, naphthalene, alpha-methylnaphthalene, beta-methylnaphthalene, diphenyl, acenaphthene, fluorene, phenanthrene, anthracene, fluoranthene, pyrene, chrysene, naphthacene, pyridine, picoline, quinoline, isoquinoline, quinaldine, indole, acridine, carbazole, hemimellitene, pseudocumene, mesitylene, prehnitene, isodurene, durene, pentamethylbenzene, hexamethylbenzene, ethylbenzene, propylbenzene, cumene, butylbenzene, cymene, triethylbenzene, hexaethylbenzene, styrene, allylbenzene, stilbene, diphenylmethane, triphenylmethane, tetraphenylmethane, terphenyl, quaterphenyl, 1,3,5-triphenylbenzene, and the like. Where $R^1$ is aryl, it is preferred that it be a residue of benzene, that is, a phenyl group.

It is most preferred that $R^1$ be the reacted moiety after the reaction of the diene or triene in a fatty acid or fatty acid ester, for example, oleic acid, linoleic acid, methyl oleate, butyl oleate, butyl tallate, methyl tallate, octyl tallate, glyceryl monooleate, glyceryl monotallate, or pentaerythritol trioleate.

Thiadiazoles useful in the practice of the present invention can be obtained commercially, for example, as the products sold under the trademarks VANCHEM® DMTD and VANLUBE® 829, both available from R. T. Vanderbilt Company, Inc. The chemical structure of the VANCHEM® DMTD brand product is understood to be:

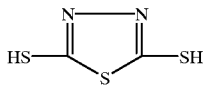

The chemical structure of the VANLUBE® 829 brand product is understood to be:

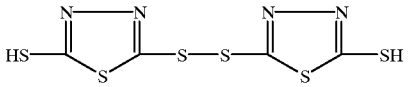

The grafting of the thiadiazole onto the copolymer can be done in the presence of heat, in the neat polymer, or the polymer dissolved in oil, or a hydrocarbon solvent, such as hexanes or xylenes. Alternatively, the grafting can be conducted in the presence of a free radical initiator.

Free radical initiators that can be used are preferably peroxides, hydroperoxides, or azo compounds and, most preferably, are those that have a boiling point higher than about 100° C. and decompose thermally within the grafting temperature range to provide free radicals. Representative of these free radical initiators are azobutyronitrile and 2,5-dimethyl-hex-3-yne-2,5 bis-tertiary-butyl peroxide. The initiator is used in an amount of between about 0.005 percent and about 1.0 percent by weight based on the weight of the reaction mixture solution. The grafting is preferably performed in an inert atmosphere, such as under nitrogen blanketing.

The additives of the present invention are useful as components in lubricant compositions. They can be employed in a variety of oils of lubricating viscosity including natural and synthetic lubricating oils and mixtures thereof. The additives can be employed in crankcase lubricating oils for spark-ignited and compression-ignited internal combustion engines. The compositions can also be used in gas engines, or turbines, automatic transmission fluids, gear lubricants, metal-working lubricants, hydraulic fluids and other lubricating oil and grease compositions. Their use in motor fuel compositions is also contemplated.

In general, the lubricant compositions of the invention contain the graft copolymer additives in a concentration ranging from about 0.1 to 30 weight percent. A concentration range for the additives ranging from about 0.5 to 15 weight percent based on the total weight of the lubricant composition is preferred. A still more preferred concentration range is from about 1.0 to about 7.5 weight percent.

Oil concentrates of the additives can contain from about 1.0 to 50 weight percent of the additive reaction product in a carrier or dilutive oil of lubricating oil viscosity.

The additives of the present invention can be employed in lubricant compositions together with conventional lubricant additives. The typical additives found in lubricating oil compositions are dispersants, detergents, rust inhibitors, antioxidants, antifoamants, friction modifiers, viscosity index improvers, and pour point depressants.

The advantages and the important features of the present invention are more apparent from the following examples.

EXAMPLE 1

A quantity of 83.4 grams of a 9 percent 5-ethylidene-2-norbornene and 52/48 ethylene/propylene terpolymer sold under the trademark Trilene®-47 was combined with 2.1 grams (0.056 mol) of 2,5-dimercapto-1,3,4-thiadiazole and 300 milliliters reagent xylenes in a one-liter resin kettle equipped with a mechanical stirrer, a reflux condenser, a thermocouple, and a gas inlet port. The system was heated to reflux (139° C.), and the conditions were maintained for 15 hours.

The reaction was cooled to 50° C., and 214 grams of 100 P mineral oil were added. The xylenes were removed by vacuum distillation (130° C. at seven millibars vacuum for one hour). The product was then pressure filtered using a five-micron filter, under 100 psig $N_2$ at 100° C. A quantity of 273 grams of a hazy, olive-green, very thick liquid product was recovered. The product was pressure filtered using a one-micron filter under 100 psig $N_2$ at 100° C. whereupon a clear, medium-yellow, very thick liquid product was obtained.

EXAMPLE 2

A quantity of 70.1 grams of the Trilene®-47 brand terpolymer was combined with 3.5 grams (0.046 mol) 2,5-dimercapto-1,3,4-thiadiazole and 321 grams of 100 P mineral oil in a one-liter resin kettle reactor equipped with a mechanical stirrer, a thermocouple, and gas inlet and outlet ports. The system was heated to 170° C., and the conditions were maintained for nine hours.

The product was pressure filtered using a one-micron filter, under 100 psig $N_2$ at 75° C., which yielded a final product that was a clear, dark brown liquid of moderate viscosity.

EXAMPLE 3

A quantity of 106.2 grams of a Trilene®-45 brand terpolymer (a 9.5 percent dicyclopentadiene, 50/50 ethylene/propylene terpolymer) was combined with 3.5 grams (0.07 mol) 2,5-dimercapto-1,3,4-thiadiazole, 300 milliliters of reagent xylenes, and 0.83 gram (0.0031 mol) dicumyl peroxide in a one-liter resin kettle equipped with a mechanical stirrer, a reflux condenser, a thermocouple, and a gas inlet port. The system was heated to reflux (139° C.), and the conditions were maintained for 16 hours.

The reaction was cooled to 100° C., and a quantity of 326 grams of 100 P mineral oil was added. The reaction was then cooled further to 60° C., whereupon 300 milliliters of reagent hexanes were added. The reaction was cooled still further to 5° C. to 10° C. and held at that temperature for one hour. The product was then pressure filtered using a five-micron filter under 100 psig $N_2$. The filtrate was hazy yellow. The product was pressure filtered two more times using a one-micron filter. The solvent was then removed by vacuum distillation (130° C. at seven millibars vacuum for one hour). The product was a hazy reddish-brown. This final product was then vacuum filtered through a Celite 545 brand filter material, whereupon a clear, thick reddish-brown liquid product was obtained.

EXAMPLE 4

A quantity of 106.7 grams of the Trilene®-47 brand terpolymer was combined with 11.3 grams (0.07 mol) 2,5-dimercapto-1,3,4-thiadiazole, 300 milliliters of reagent xylenes, and 1.0 gram (0.0037 mol) dicumyl peroxide in a one-liter kettle reactor equipped with a mechanical stirrer, a reflux condenser, a thermocouple, and a gas inlet port. The system was heated to reflux (139° C.), and the conditions were maintained for eight hours.

The reaction was cooled to 100° C., and a quantity of 298 grams of 100 P mineral oil was added. Vacuum distillation was used to remove the xylenes (100° C. at seven millibars vacuum for one-half hour). The product was a milky, light yellow liquid. It was cooled to 30° C., and 400 milliters of reagent hexanes were added. This mixture was agitated for one-half hour. The product was vacuum filtered through Celite 545 brand filter material. The product was slightly turbid. The solution was then passed through the Celite brand filter material a second time, yielding a clear, light-yellow solution. The solvent was removed by vacuum distillation (90° C. at seven millibars vacuum for one hour) whereupon a clear, amber liquid of moderate viscosity was obtained.

EXAMPLE 5

A quantity of 83.4 grams of the Trilene®-47 brand terpolymer was combined with 2.1 grams (0.056 mol) of 2,5-dimercapto-1,3,4-thiadiazole and 300 milliliters of reagent xylenes in a one-liter resin kettle equipped with a mechanical stirrer, a reflux condenser, a thermocouple, and a gas inlet port. The system was heated to reflux (139° C.), and the conditions were maintained for 15 hours.

The reaction was cooled to 50° C., and 214 grams of 100 P mineral oil were added. The xylenes were removed by vacuum distillation (130° C. at seven millibars vacuum for one hour). The product was then pressure filtered using a five-micron filter, under 100 psig $N_2$ at 100° C. A quantity of 273 grams of a hazy, olive-green, very thick liquid product was recovered. The product was pressure filtered using a one-micron filter under 100 psig $N_2$ at 100° C. whereupon a clear, medium-yellow, very thick liquid product was obtained.

EXAMPLE 6

The antiwear properties of the reaction product of this invention in a fully formulated lubricating oil were determined in the "Four-Ball Wear Test," described below, under the ASTM D 4172 test conditions. The fully formulated lubricating oils tested in this example also contained 1.0 weight percent cumene hydroperoxide. The additives were tested for effectiveness in two motor oil formulations, as described in Table 2, and compared to identical formulations with an without any zinc dialkyldithiophosphate. In Table 1 the numerical value of the test results (Average Wear Scar Diameter millimeters (mm)) decreases with an increase in effectiveness. In many instances, antiwear additives are effective in lubricating oil containing no other additives.

Four-Ball Wear Test

I. Purpose of Tests

The "Four-Ball Wear Test" evaluates the antiwear performance of oil and grease formulations and transportation fuels, such as diesel.

II. Apparatus

A Four-Ball Wear Test machine is used to perform this evaluation. Four balls are arranged in an equilateral tetrahedron. The lower three balls are clamped securely in a test cup filled with lubricant and the upper ball is held by a chuck that is motor-driven. The upper ball rotates against the fixed lower balls. Load is applied in an upward direction through a weight/lever arm system. Loading is through a continuously variable pneumatic loading system. Heaters allow operation at elevated oil temperatures.

The testing of this example was done on a Falex Variable Drive Four-Ball Wear Test Machine.

III. Test Procedures

The three stationary steel balls are immersed in 10 milliliters of formulated oil to be tested, and the fourth steel ball is rotated on top of the three stationary balls in "point-to-point contact." The machine is operated for one hour at 75° C. with a load of 40 kilograms and a rotational speed of 1,200 revolutions per minute.

TABLE 1

Four-Ball Wear Results

| Compound | Formulation | Wear Scar Diameter, mm | Weight Percent Active Additive |
|---|---|---|---|
| Example 1 | A | 0.64 | 1.1 |
| Example 1 | A | 0.84 | 1.0 |
| Example 3 | A | 0.77 | 1.0 |
| Example 4 | A | 0.84 | 1.0 |
| Example 5 | A | 0.73 | 1.0 |
| No Antiwear Additive | A | 0.93 | 0.0 |
| ZDDP | A | 0.46 | 1.0[1] |
| Trilene ® 45 | A | 1.00 | 1.0 |
| Trilene ® 47 | A | 0.96 | 1.0 |
| Example 1 | B | 0.82 | 1.1 |
| Example 2 | B | 0.83 | 1.0 |
| No Antiwear Additive | B | 0.98 | 0.0 |
| ZDDP | B | 0.53 | 1.0[1] |
| Trilene ® 47 | B | 0.93 | 1.0 |

[1]1.0 weight percent ZDDP is equal to 0.1 weight percent phosphorus in the fully formulated oil.

TABLE 2

SA 10W-30 Motor Oil Formulations

| Formulation A | Wt. % | Formulation B | Wt. % |
|---|---|---|---|
| Solvent Neutral 100 | 22.8 | Solvent Neutral 100 | 22.8 |
| Solvent Neutral 150 | 60.0 | Solvent Neutral 150 | 60.0 |
| Succinimide Dispersant | 7.5 | Succinimeide Dispersant | 7.5 |
| Overbased Calcium Phenate Detergent | 2.0 | Overbased Calcium Sulfonate Detergent | 2.0 |
| Neutral Calcium Sulfonate Detergent | 0.5 | Neutral Calcium Sulfonate Detergent | 0.5 |
| Antioxidant | 0.5 | Antioxidant | 0.5 |
| Rust Inhibitor | 0.1 | Rust Inhibitor | 0.1 |
| Pour Point Depressant | 0.1 | Pour Point Depressant | 0.1 |

TABLE 2-continued

SA 10W-30 Motor Oil Formulations

| Formulation A | Wt. % | Formulation B | Wt. % |
|---|---|---|---|
| OCP VI Improver | 5.5 | OCP VI Improver | 5.5 |
| Antiwear Additive[2] | 1.0 | Antiwear Additive | 1.0 |

[2]In the case of No Antiwear Additive in Table 1, solvent neutral 150 is put in its place at 1.0 weight percent.

Dispersancy Test Method

The oils for dispersancy were fully formulated SAE 80W-90 API GL-5 quality gear oils. The dispersant test was run with 50 milliliters of sample. The oil was placed into a four-ounce jar and then put into an air circulating oven for 168 hours at 150° C. The samples were analyzed by two methods: a blotter test and a percent hexanes insolubles test. The blotter test uses one drop of oil placed on a piece of filter paper. The ring formed is evaluated visually for how the sludge is dispersed across the paper. A uniform ring is rated excellent, while separation with sludge staying toward the center is rated very poor. The percent hexane insolubles test was done by diluting the oil with hexanes, centrifuging, collecting the solid mass, and repeating the process two more times. Then the hexanes were removed, and the solids were oven-dried and weighed. The results of the blotter test and the percent hexane insolubles test are in Table 3.

TABLE 3

Dispersant Test Results

| Compound | Blotter | % Hexane Insolubles | Wt. % Active Additive |
|---|---|---|---|
| Example 1 Succinimide Dispersant | Excellent | 1.2 | 3 |
| | Excellent | 1.0 | 3 |
| No Dispersant | Very Poor | 6.3 | 0 |

The invention has been described in detail with particular reference to preferred embodiments thereof, but it is understood that variations and modifications can be effected within the spirit and scope of the invention.

What is claimed is:

1. A graft copolymer comprising:

a copolymer prepared by the interpolymerization of a mixture of monomers comprising:

ethylene, a $C_3$–$C_{12}$ alpha monoolefin, and a polyene being a member selected from the group consisting of non-conjugated dienes and trienes;

having grafted thereon:

a 2-mercapto-1,3,4-thiadiazole moiety.

2. The graft copolymer of claim 1 wherein the $C_3$–$C_{12}$ alpha monoolefin is propylene.

3. The graft copolymer of claim 1 wherein the polyene is a member selected from the group consisting of 1,4-hexadiene; 1,5-hexadiene; 1,4-pentadiene, 2-methyl-1,4-pentadiene; 3-methyl-1,4-hexadiene; 4-methyl-1,3-hexadiene; 1,7-octadiene; 1,9-decadiene; exodicyclopentadiene; endodicyclopentadiene; 5-propenylnorbornene; 5-(buten-2-yl)norbornene; 5-(2-methylbutene-{2'}-yl)norbornene; 5-methyl-6-propenylnorbornene; 5-methylene-2-norbornene; 5-ethylidene-2-norbornene; 5-isopropylidene-2-norbornene; vinylnorbornene; cyclohexenylnorbornene; methylnorbornadiene; ethylnorbornadiene; propylnorbornadiene; 1,5-cyclooctadiene; 1,4-cyclooctadiene; 1-isopropylidene-3a,4,7,7a-tetrahydroindene; 1-isopropyl idenedicyclopentadiene;

dehydroisodicyclopentadiene; and 2-(2-methylene-4-methyl-3-pentenyl){2.2.1}bicyclo-5-heptene.

4. The graft copolymer of claim 1 wherein the 2-mercapto-1,3,4-thiadiazole moiety is derived from a compound having the structure

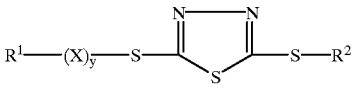

wherein $R^1$ is hydrogen, alkyl, alkenyl, aryl, alkaryl, aralkyl, or 2-hydroxyalkyl;

X is sulfur;

Y is 0 or 1; and $R^2$ is hydrogen or

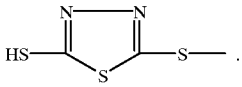

5. The graft copolymer of claim 4 wherein $R^1$ is hydrogen and Y is 0.

6. The graft copolymer of claim 5 wherein $R^2$ is hydrogen.

7. The graft copolymer of claim 4 wherein $R^1$ is the reacted moiety after reaction of the polyene in at least one fatty acid or fatty acid ester.

8. The graft copolymer of claim 7 wherein the fatty acid or fatty acid ester is a member selected from the group consisting of oleic acid, linoleic acid, methyl oleate, butyl oleate, butyl tallate, methyl tallate, octyl tallate, glyceryl monooleate, glyceryl monotallate, and pentaerythritol trioleate.

9. The graft copolymer of claim 1 having the structure

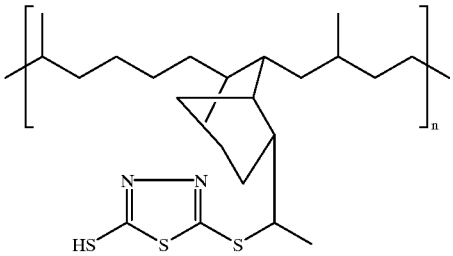

where n is an integer in the range of about 1 to about 10.

10. A lubricant additive comprising a graft copolymer comprising:

a copolymer prepared by the interpolymerization of a mixture of monomers comprising:

ethylene, a $C_3$–$C_{12}$ alpha monoolefin, and a polyene being a member selected from the group consisting of non-conjugated dienes and trienes;

having grafted thereon:

a 2-mercapto-1,3,4-thiadiazole moiety.

11. The additive of claim 10 wherein the lubricant is a lubricating oil.

12. The additive of claim 10 wherein the $C_3$–$C_{12}$ alpha monoolefin is propylene.

13. The additive of claim 10 wherein the polyene is a member selected from the group consisting of 1,4-hexadiene; 1,5-hexadiene; 1,4-pentadiene, 2-methyl-1,4-pentadiene; 3-methyl-1,4-hexadiene; 4-methyl-1,3-hexadiene; 1,7-octadiene; 1,9-decadiene; exodicyclopentadiene; endodicyclopentadiene; 5-propenylnorbornene; 5-(buten-2-yl)norbornene; 5-(2-methylbutene-{2'}-yl)norbornene; 5-methyl-6-propenylnorbornene; 5-methylene-2-norbornene; 5-ethylidene-2-norbornene; 5-isopropylidene-2-norbornene; vinylnorbornene; cyclohexenylnorbornene; methylnorbornadiene; ethylnorbornadiene; propylnorbornadiene; 1,5-cyclooctadiene; 1,4-cyclooctadiene; 1-isopropylidene-3a,4,7,7a-tetrahydroindene; 1-isopropylidenedicyclopentadiene; dehydroisodicyclopentadiene; and 2-(2-methylene-4-methyl-3-pentenyl){2.2.1}bicyclo-5-heptene.

14. The additive of claim 10 wherein the 2-mercapto-1,3,4-thiadiazole moiety is derived from a compound having the structure

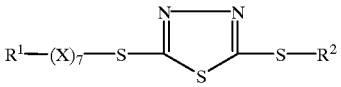

wherein $R^1$ is hydrogen, alkyl, alkenyl, aryl, alkaryl, aralkyl, or 2-hydroxyalkyl;

X is sulfur;

Y is 0 or 1; and $R^2$ is hydrogen or

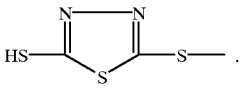

15. The additive of claim 14 wherein $R^1$ is hydrogen and Y is 0.

16. The additive of claim 15 wherein $R^2$ is hydrogen.

17. The additive of claim 14 wherein $R^1$ is the reacted moiety after reaction of the polyene in at least one fatty acid or fatty acid ester.

18. The additive of claim 17 wherein the fatty acid or fatty acid ester is a member selected from the group consisting of oleic acid, linoleic acid, methyl oleate, butyl oleate, butyl tallate, methyl tallate, octyl tallate, glyceryl monooleate, glyceryl monotallate, and pentaerythritol trioleate.

19. The additive of claim 10 wherein the graft copolymer has the structure

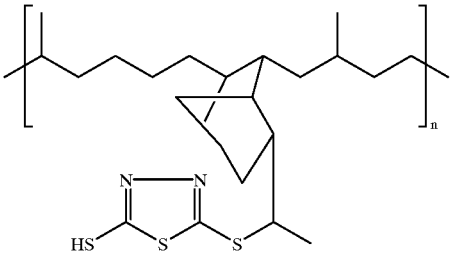

where n is an integer in the range of about 1 to about 10.

20. A lubricant comprising a lubricant additive comprising a graft copolymer comprising:

a copolymer prepared by the interpolymerization of a mixture of monomers comprising:

ethylene, a $C_3$–$C_{12}$ alpha monoolefin, and a polyene being a member selected from the group consisting of non-conjugated dienes and trienes;

having grafted thereon:

a 2-mercapto-1,3,4-thiadiazole moiety.

21. The lubricant of claim 20 wherein said lubricant is a lubricating oil.

22. The lubricant of claim 20 wherein the $C_3$–$C_{12}$ alpha monoolefin is propylene.

23. The lubricant of claim 20 wherein the polyene is a member selected from the group consisting of 1,4-hexadiene; 1,5-hexadiene; 1,4-pentadiene, 2-methyl-1,4-pentadiene; 3-methyl-1,4-hexadiene; 4-methyl-1,3-hexadiene; 1,7-octadiene; 1,9-decadiene; exodicyclopentadiene; endodicyclopentadiene; 5-propenylnorbornene; 5-(buten-2-yl)norbornene; 5-(2-methylbutene-{2'}-yl)norbornene; 5-methyl-6-propenylnorbornene; 5-methylene-2-norbornene; 5-ethylidene-2-norbornene; 5-isopropylidene-2-norbornene; vinylnorbornene; cyclohexenylnorbornene; methylnorbornadiene; ethylnorbornadiene; propylnorbornadiene; 1,5-cyclooctadiene; 1,4-cyclooctadiene; 1-isopropylidene-3a,4,7,7a-tetrahydroindene; 1-isopropylidenedicyclopentadiene; dehydroisodicyclopentadiene; and 2-(2-methylene-4-methyl-3-pentenyl){2.2.1}bicyclo-5-heptene.

24. The lubricant of claim 20 wherein the 2-mercapto-1,3,4-thiadiazole moiety is derived from a compound having the structure

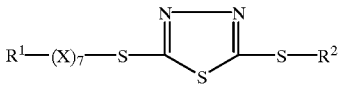

wherein $R^1$ is hydrogen, alkyl, alkenyl, aryl, alkaryl, aralkyl, or 2-hydroxyalkyl;

X is sulfur;
Y is 0 or 1; and
$R^2$ is hydrogen or

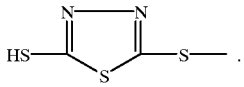

25. The lubricant of claim 24 wherein $R^1$ is hydrogen and Y is 0.

26. The lubricant of claim 25 wherein $R^2$ is hydrogen.

27. The lubricant of claim 24 wherein $R^1$ is the reacted moiety after reaction of the polyene in at least one fatty acid or fatty acid ester.

28. The lubricant of claim 27 wherein the fatty acid or fatty acid ester is a member selected from the group consisting of oleic acid, linoleic acid, methyl oleate, butyl oleate, butyl tallate, methyl tallate, octyl tallate, glyceryl monooleate, glyceryl monotallate, and pentaerythritol trioleate.

29. The lubricant of claim 20 wherein the graft copolymer has the structure

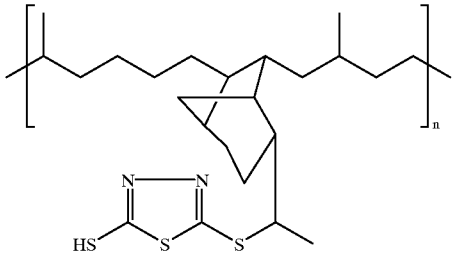

where n is an integer in the range of about 1 to about 10.

* * * * *